US011661192B2

(12) United States Patent
Swaidan

(10) Patent No.: US 11,661,192 B2
(45) Date of Patent: May 30, 2023

(54) DRONES AND DRONE SYSTEMS

(71) Applicant: Aerbots, Inc., Lansing, MI (US)

(72) Inventor: Mario Swaidan, Plymouth, MI (US)

(73) Assignee: Aerbots, Inc., Lansing, MI (US)

( * ) Notice: Subject to any disclaimer, the term of this patent is extended or adjusted under 35 U.S.C. 154(b) by 0 days.

(21) Appl. No.: 17/670,265

(22) Filed: Feb. 11, 2022

(65) Prior Publication Data

US 2022/0258862 A1 Aug. 18, 2022

Related U.S. Application Data

(60) Provisional application No. 63/149,216, filed on Feb. 12, 2021.

(51) Int. Cl.
| | | |
|---|---|---|
| *B64C 39/02* | (2023.01) | |
| *B64U 10/13* | (2023.01) | |
| *B64U 30/20* | (2023.01) | |
| *B64U 50/19* | (2023.01) | |
| *B64D 27/24* | (2006.01) | |
| *B64D 31/02* | (2006.01) | |
| *B62D 63/04* | (2006.01) | |

(52) U.S. Cl.
CPC ............ *B64C 39/024* (2013.01); *B62D 63/04* (2013.01); *B64D 27/24* (2013.01); *B64D 31/02* (2013.01); *B64D 2211/00* (2013.01); *B64U 10/13* (2023.01); *B64U 30/20* (2023.01); *B64U 50/19* (2023.01)

(58) Field of Classification Search
CPC ........ B64U 30/20; B64U 50/19; B64U 10/13; B64C 39/024

USPC .......................................................... 244/56
See application file for complete search history.

(56) References Cited

U.S. PATENT DOCUMENTS

| | | | |
|---|---|---|---|
| 3,184,183 A | * | 5/1965 | Plasecki .................. B64C 27/20 |
| | | | 244/23 R |
| 7,249,732 B2 | | 7/2007 | Sanders, Jr. et al. |
| 8,322,648 B2 | | 12/2012 | Kroetsch et al. |

(Continued)

FOREIGN PATENT DOCUMENTS

| | | |
|---|---|---|
| CN | 205150243 | 4/2016 |
| CN | 205273860 | 6/2016 |

(Continued)

*Primary Examiner* — Christopher P Ellis
(74) *Attorney, Agent, or Firm* — Panagos Kennedy PLLC; Bill Panagos; Linda Kennedy

(57) ABSTRACT

Drones with propulsions systems supported in a housing are provided where the orientation of the housing is independent from the orientation of the propulsion system. Drones are provided where a propulsion system is rotatable about a first axis and a second axis that is perpendicular to the first axis, permitting the propulsion system to assume substantially any position with a sphere. Drones are provided where a bladeless inner tube is rotatable about a first axis and a second axis that is perpendicular to the first axis, permitting the inner tube to assume substantially any position within a sphere. Drone systems are provided with connectable unit drones. An unmanned land vehicle is provided having a wheel assembly that is rotatable about a first axis and a second axis that is perpendicular to the first axis, permitting the wheel assembly to assume substantially any position with a sphere.

14 Claims, 13 Drawing Sheets

(56) References Cited

U.S. PATENT DOCUMENTS

| | | | |
|---|---|---|---|
| 8,794,566 B2 * | 8/2014 | Hutson | B64C 27/006 244/50 |
| 8,979,016 B2 * | 3/2015 | Hayden, III | B64C 29/00 244/17.11 |
| 10,118,697 B2 * | 11/2018 | Weissenberg | B64C 39/024 |
| 10,324,462 B2 | 6/2019 | Jassowski et al. | |
| 10,549,850 B1 * | 2/2020 | Ryan | B64U 80/70 |
| 10,974,823 B2 * | 4/2021 | Van Niekerk | B64D 47/08 |
| D925,399 S * | 7/2021 | Zhang | D12/16.1 |
| 11,052,998 B2 * | 7/2021 | Mores | B64D 27/24 |
| D943,457 S * | 2/2022 | Liu | D12/16.1 |
| 11,465,733 B2 * | 10/2022 | Reichensperger | B64C 11/001 |
| 2006/0226281 A1 * | 10/2006 | Walton | B64C 27/20 244/17.23 |
| 2009/0283629 A1 * | 11/2009 | Kroetsch | A63H 27/12 244/17.23 |
| 2014/0034776 A1 * | 2/2014 | Hutson | F16M 11/18 244/17.17 |
| 2015/0274294 A1 | 10/2015 | Dahlstrom | |
| 2017/0313418 A1 * | 11/2017 | Yoon | B64C 27/32 |
| 2020/0033851 A1 * | 1/2020 | Hajimiri | B64C 37/02 |
| 2020/0172234 A1 * | 6/2020 | Neff | B64C 29/0033 |
| 2021/0387739 A1 * | 12/2021 | Neff | B64C 25/405 |

FOREIGN PATENT DOCUMENTS

| | | | | |
|---|---|---|---|---|
| CN | 205998121 | | 3/2017 | |
| EP | 3354560 B1 * | | 6/2022 | B64C 11/001 |
| GB | 2575709 A * | | 1/2020 | B64C 19/00 |
| KR | 1019681640000 | | 4/2019 | |
| KR | 20190002758 U * | | 2/2021 | |
| WO | WO-2016153580 A2 * | | 9/2016 | B64C 27/08 |
| WO | WO-2022243684 A1 * | | 11/2022 | |

* cited by examiner

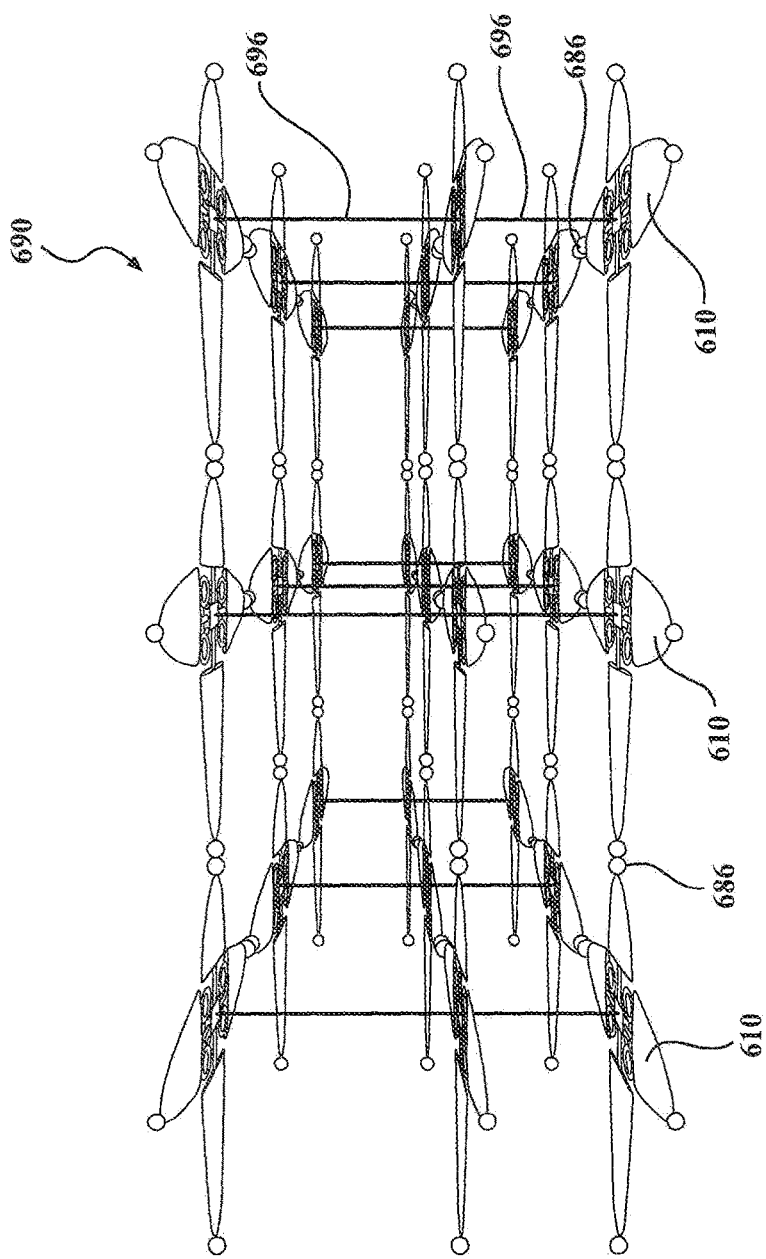
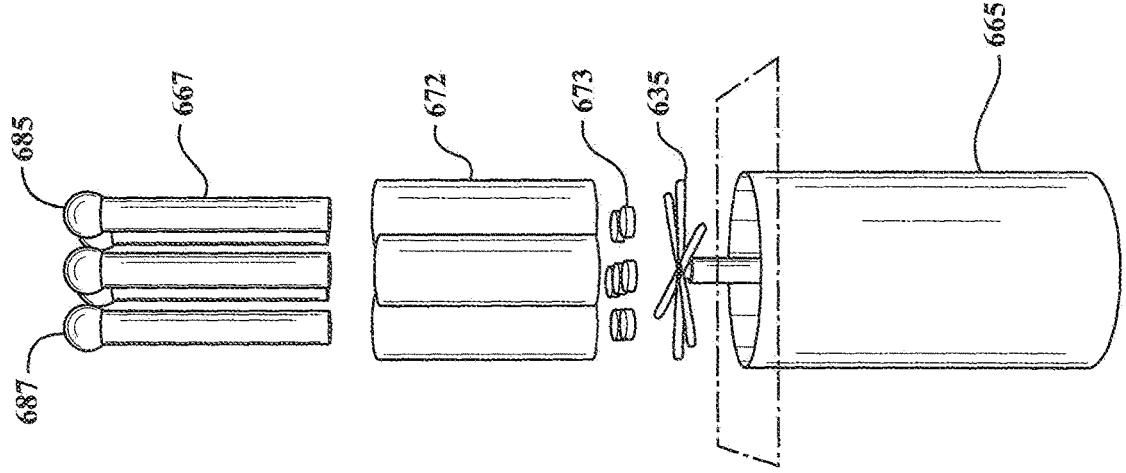
FIG. 17
FIG. 16

DRONES AND DRONE SYSTEMS

CROSS-REFERENCE TO RELATED APPLICATIONS

This disclosure claims the benefit of the priority date of U.S. provisional patent application No. 63/149,216, filed Feb. 12, 2021, incorporated herein in its entirety.

TECHNICAL FIELD

The present disclosure generally relates to unmanned vehicles such as drones and related systems, apparatuses and methods.

BACKGROUND

A drone is an unmanned vehicle that is remotely piloted through fluid, such as air or water, or remotely driven on land. The operation of a drone may have various degrees of autonomy: either under remote control by a human operator, or fully or intermittently autonomously, by onboard controllers.

Typical air-based drone systems for civilians use a helicopter style operation central core having arms extending therefrom. The ends of the arms typically have a propeller fixed on the arm. This configuration can cause inefficient operation because the orientation of the propeller is tied to the orientation of the arms and the drone. For example, when the propellers tilt in response to a remote command, so must the whole arm and the whole drone. Improvements to drone configurations may provide more efficient and more responsive operation.

Traditional drones also tend to have propellers that are exposed to the elements. Exposed propellers can be damaged by flying debris, other crafts, insects, birds, and trees. In traditional drones, if one propeller or motor becomes damaged and stops functioning, the entire drone may fail. If the drone fails, the drone may fall to the ground and become more damaged. Improvements to drone configurations may provide protection from the elements and/or increased durability.

Traditional drones have been known to fly in swarms in drone shows, where drones are near each other and in cooperation with one another. However, traditional drone swarms do not provide physical connections between unit drones. Physically connected drones in a drone system may be able to scale the thrust and the durability of unit drones for any number of applications.

BRIEF DESCRIPTION OF DRAWINGS

The embodiments set forth in the drawings are illustrative and exemplary in nature and not intended to limit the subject matter defined by the claims. The following detailed description can be understood when read in conjunction with the following drawings, where like structure is indicated with like reference numerals.

FIG. 16 is a simplified exploded view of a portion of a deployment system.

FIG. 17 is an exemplary drone system.

DETAILED DESCRIPTION

All figures are non-limiting exemplary illustrative embodiments of the claims. Modifications to specifically-described drones, systems, the order of steps in processes, etc., are contemplated. The drones, drone systems, assemblies and methods are capable of other embodiments and of being practiced and carried out in various ways. Also, it is to be understood that the phraseology and terminology employed herein are for the purpose of the description and should not be regarded as limiting.

Figure 1:
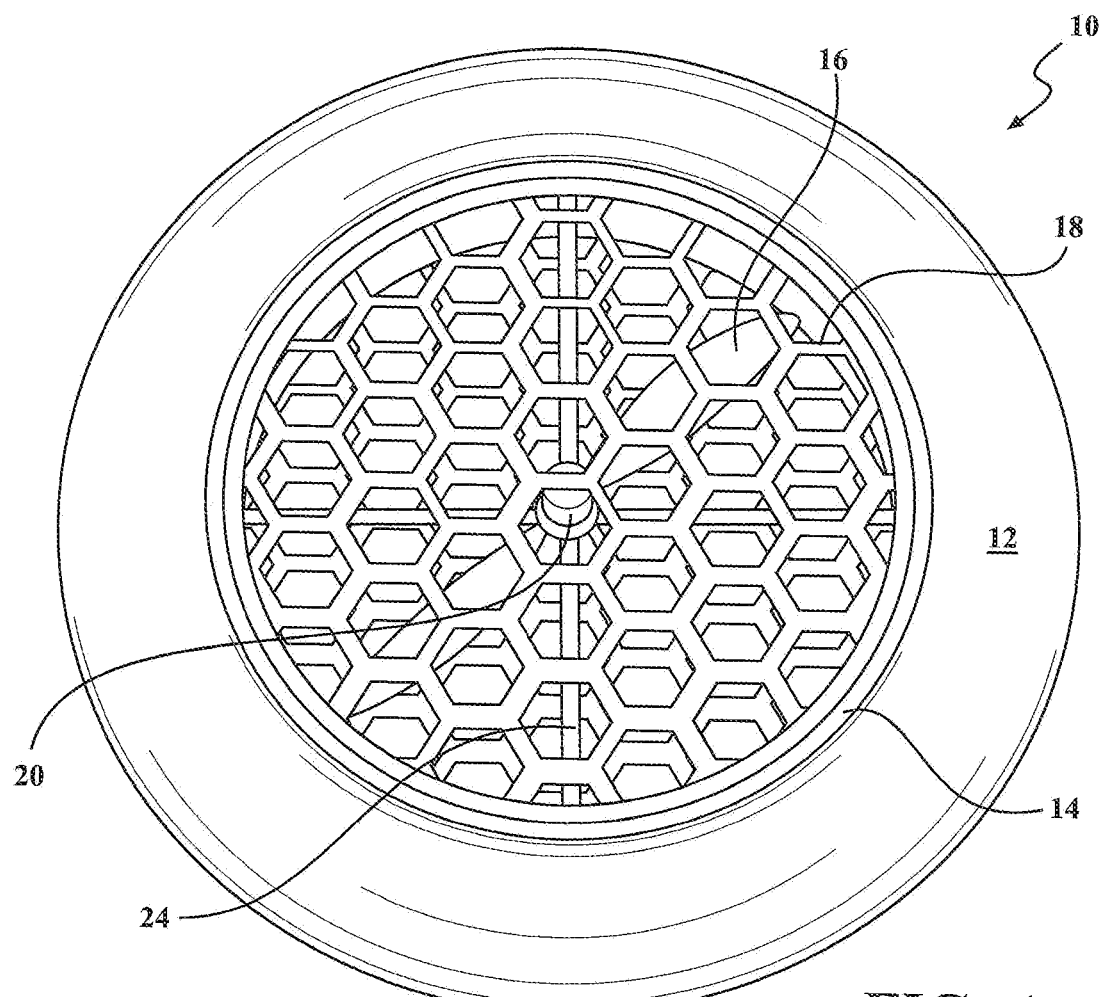
FIG. 1 is an exemplary drone.
Figure 2:
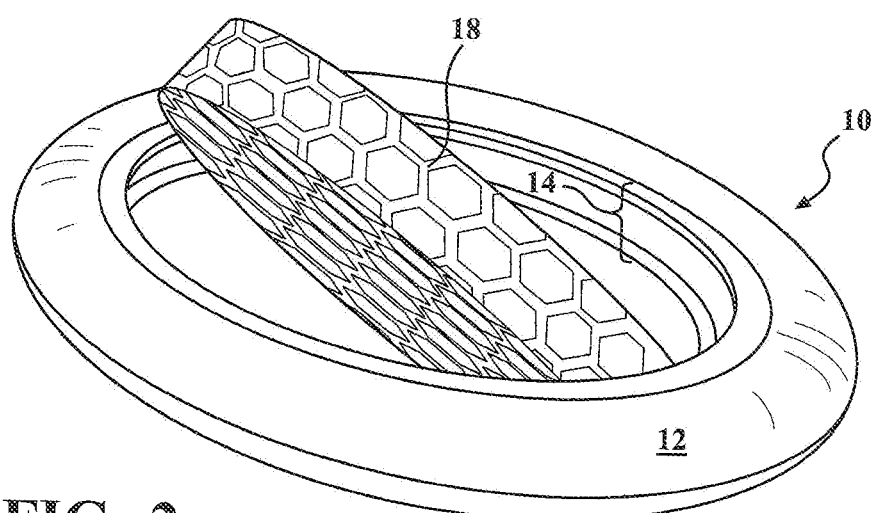
FIG. 2 is the exemplary drone of FIG. 1 changing direction.

Referring to FIGS. 1 and 2, an exemplary drone 10 is illustrated. Drone 10 has a housing 12 that supports a rotation ring assembly 14. The housing can be made of any of a number of light weight and durable materials. For aerial uses, the housing may be made of any number of materials, including but not limited to plastic, carbon fiber, metals such as aluminum and aluminum alloys or wood, or combinations of one or more such materials. The housing may optionally having a coating or be otherwise treated for protection from the elements. For water-based uses, the housing may be made of any number of materials, including but not limited to plastic, carbon fiber, or a treated and/or coated metal or wood.

The drone 10 has a propulsion system. In the illustrated embodiment, the propulsion system comprises propeller 16 driven by motor 20, which may be electric. Other propulsion systems are contemplated. Suitable propulsion systems may include power cells such as hydrogen fuel cells. In this non-limiting example, motor 20 is powered by a power source such as a battery (not shown) and is in electrical communication with a controller (not shown) that receives, processes and causes instructions to be executed. In FIG. 1, the propulsion system is supported in protective cage 18 by rod 24. In some embodiments, it is contemplated that protective cage 18 may be omitted. The protective cage 18 protects propeller 16 and permits sufficient fluid (such as air or water) to pass through the protective cage 18 for the propulsion system to generate thrust to propel the drone 10. The protective cage 18 also prevents certain larger debris in the environment from reaching and damaging the propeller 16. In one embodiment, the fluid passes through openings in a honeycomb configuration, as illustrated. Other configurations are contemplated that permit sufficient fluid flow and provide protection to the propeller 16. The protective cage 18 may be formed from any of a number of lightweight materials, including carbon fiber, plastic and metal, and combinations thereof. The protective cage 18 may take on any of a number of shapes and sizes, including but not limited to the hollow disc as shown, or a hollow sphere, or still another shape that is sized to snugly outline a particular propulsion system.

In operation, by contrasting FIG. 1 with FIG. 2, it can be seen that the propulsion system encased in protective cage 18 has an orientation that is independent from an orientation of the housing 12 of drone 10. Without being bound by theory, it is believed that this independence provides increased responsiveness of the drone 10 to instructions received remotely to turn, tilt, rise, drop, hover and the like. This independence may make the propulsion of the drone 10 through fluid (air, water, or other media) smoother and more stable, including in hovering positions. It is also believed, without being bound by theory, that this independence may create less drag and may improve efficiency by reducing energy usage. This is because, at least in part, the propulsion system can tilt to change direction without having to tilt the drone 10 in its entirety.

Figure 3:
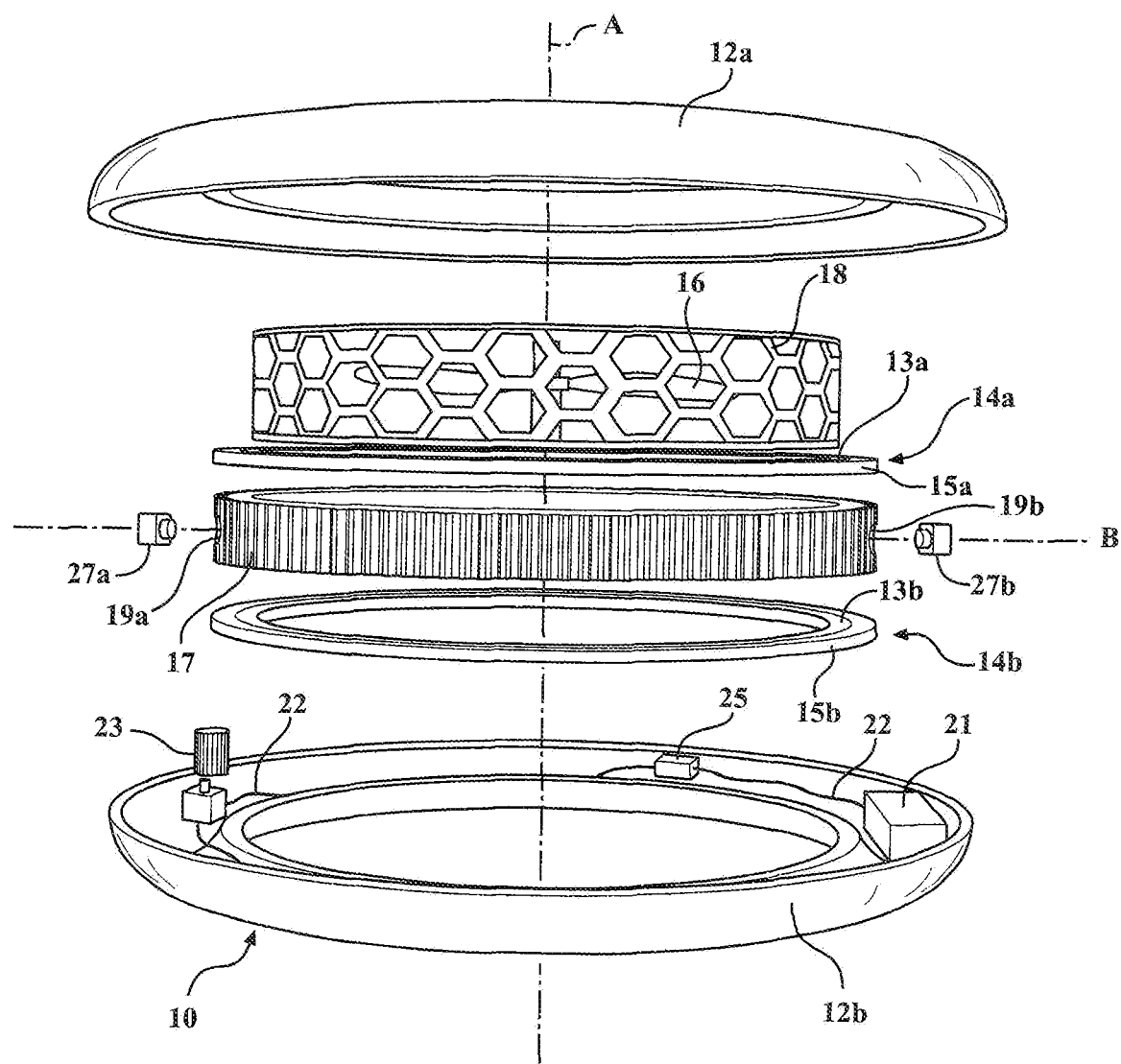
FIG. 3 is a simplified exploded view of the exemplary drone of FIG. 1.

FIG. 3 is an exploded view of an exemplary drone 10. Referring to FIGS. 1-3, housing 12 has a top housing portion 12a and a bottom housing portion 12b. Top housing portion 12a and bottom housing portion 12b may be removably attached to one another or may be integrally formed. The ring assembly 14 comprises a top bearing 14a, a bottom bearing 14b, and a wall 17 extending therebetween. As drawn, the wall 17 is attached to an inner movable portion 13a of bearing 14a and an inner movable portion 13b of bearing 14b. Bearings 14a and 14b are fixed to top housing portion 12a and bottom housing portion 12b respectively while permitting rotation of their inner movable portions relative to housing portions 12a and 12b. An outer portion 15a of bearing 14a and an outer portion 15b of bearing 14b may be fixed to housing portions 12a and 12b respectively using mechanical devices and/or using chemical means, including but not limited to screws, bolts, pins, and/or adhesives. Inner portions 13a and 13b of bearings 14a and 14b rotate within the outer portions 15a and 15b, which are shaped to retain the inner portions 13a or 13b by having for example, a retention flange. Other retention mechanisms are contemplated.

In FIG. 3, wall 17 is mechanically connected to inner portions 13a and 13b of bearings 14a and 14b. That is, the wall 17 and the inner portions 13a and 13b rotate together as a unit. The mechanical fitting between wall 17 and the inner portions 13a and 13b may be made any of a number of attachment mechanisms. In one embodiment, top and bottom portions of wall 17 have ribs and the inner portions 13a and 13b have grooves to receive the ribs of the top and bottom portions of wall 17. In some embodiments, the inner portions 13a and 13b are electrically conductive (along with wall 17) and are in electrical communication with a power source, such as battery 21 through wiring 22. Generally, electrical components are also in electrical communication with controller 25, which is adapted to receive, process and cause instructions to be executed. Many commercially available controllers may be suitable for use with drone 10. In one non-limiting example for a personal-use/hobby scale drone, a suitable controller 25 may be Seriously Pro Racing F3-Mini V2 Flight Controller, which is available through www.hobbyking.com (Seriously Pro Pty LTD is located in Caringbah, New South Wales, Australia. This non-limiting example has these specifications: Processor: STM32F303 CPU, 72 Mhz inc FPU, Micro SD: MicroSD card slot (SD/SDHC, up to 32 GB), Accelerometer/gyro/compass: MPU9250, Barometer: BMP280 and Voltage Regulator: 5 V regulator for powering receiver and small servos. In some embodiments, controller 25 comprises a motherboard for controlling electronic components, a receiver capable of communicating with a remote control operated by a user, a power source (e.g. a rechargeable battery, a replaceable battery), a voltage alarm and a power distribution cable to facilitate electrical communication, including but not limited to electrical communications with electronic speed controllers located in different positions on a drone.

In the illustrated exemplary embodiment, an external rotator 23 drives circumferential rotation of the movable portions of the ring assembly 14 about a first axis A. External rotator 23 may be an assembly that comprises a motor (for example, external rotator 23 may comprise a servo) to drive motion. The external rotator 23 has an outer surface that is shaped for mechanical engagement with the outer surface of wall 17. As illustrated, wall 17 has an outer surface that is toothed about its periphery to mechanically engage with an outer surface external rotator 23 with complementary receiving structure, as in a gear. For example, the external rotator assembly may include a 3D-printed gear attached to a servo.

Other mechanical engagements may be suitable. In this example, when the controller 25 receives a command to cause the movable portions of the ring assembly rotate about axis A, it sends a signal to external rotator 23 which executes the instruction by causing circumferential rotation of the wall 17 and inner portions 13a and 13b of the bearings 14a and 14b. External rotator 23 may be attached to housing 12 using mechanical devices and/or using chemical means, including screws, bolts, pins, and/or adhesives. External rotator 23 is "external" in the sense that it resides outside of the ring assembly 14 and is positioned distal to the axis A about which it drives rotation. Without being bound by theory, because the external rotator 23 is outside of the propulsion system and protective cage 18 and as such not near its axis of rotation (Axis A), drone 10 benefits from physical leverage, and the drone operates more efficiently.

In the illustrated exemplary embodiment, there are two internal rotators 27a and 27b. Internal rotators are "internal" in the sense that they reside substantially within the ring assembly 14. Internal rotators 27a and 27b drive rotation of the propulsion system about a second axis B, which is perpendicular to axis A. Axis B runs from internal rotator 27a through to internal rotator 27b, which is positioned opposite internal rotator 27a. In the exemplary configuration of FIG. 3, both internal rotators (27a, 27b) are active. By "active," it is meant that a rotator drives rotation such as through a motor like a servo. Commercially available internal rotators that may be suitable for a personal-use/hobby scale drone include standard servo model HS-485HB from Hitec Commercial Solutions of San Diego Calif. It is contemplated that one internal rotator may be passive. A non-limiting example of a passive rotator is a bearing surface that permits but does not drive rotation.

Figure 4:
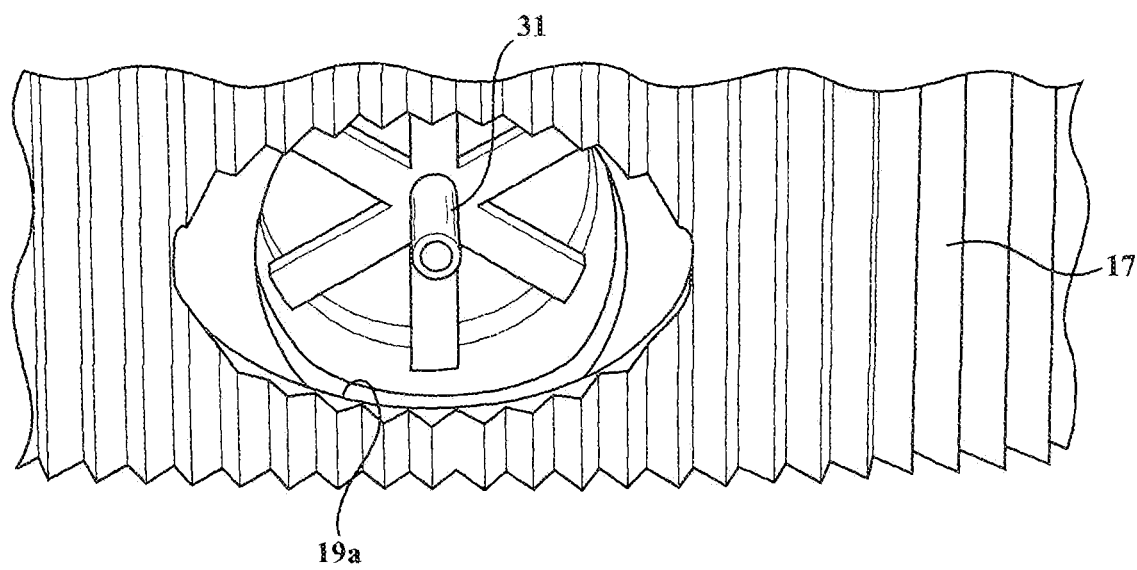
FIG. 4 is a view of exemplary receiving structure on a drone.

Referring to FIGS. 3 and 4, internal rotators 27a and 27b are attached to wall 17. Wall 17 has a thickness, and openings 19a and 19b opposite one another in wall 17 expose an upward facing surface of wall 17 at the openings 19a and 19b. As illustrated, bottom surfaces of internal rotators 27a and 27b are treated with an adhesive and pressure is applied to adhere the internal rotators 27a and 27b to the upward facing surface of wall 17 at openings 19a and 19b. The attachment can be any of a number of mechanisms, using mechanical devices and/or using chemical means, including screws, bolts, pins, and/or one or more adhesives.

Internal rotators 27a and 27b are also attached, directly or indirectly, to the propulsion system. Here, as shown in FIGS.

3 and 4, the internal rotators 27a and 27b would be connectable into receiving structure 31 that is integral with or attached to the protective cage 18, which encases and supports the propulsion system. In some embodiments, the receiving structure 31 may be on structure other than the protective cage 18, including components of the propulsion system or components that support the propulsion system. The connection between the propulsion system and the internal rotators 27a and 27b can be mechanical and/or electrical. Electrical connections may be used in instances where the wall 17 and inner portions 13a and 13b of bearings 14a and 14b are powered. Where powered, one or more of the internal rotators 27a, 27b are in electrical communication with the motor 20 and propeller 16 of FIG. 2 through, for example, a contact or wiring in or on or comprising rod 24 in the protective cage 18. The mechanical connection of the active internal rotator to the protective cage 18 or propulsion system may include any of number of attachment mechanisms, including mechanical clips, screws, nuts, pins and the like, and/or chemical adhesives.

In this example, when the controller 25 receives a command to cause the propulsion system rotate about axis B, it sends a signal to internal rotators 27a and 27b which execute the instruction by causing rotation about axis B of the protective cage 18 that encases the propulsion system. Because axis A and B are perpendicular and because 360 degree rotation about axis A of the movable portions of the ring assembly 14 is independent from the 360 degree rotation about axis B of the protective cage 18 and the propulsion system, the propulsion system can assume substantially any position within a sphere.

Figure 5:
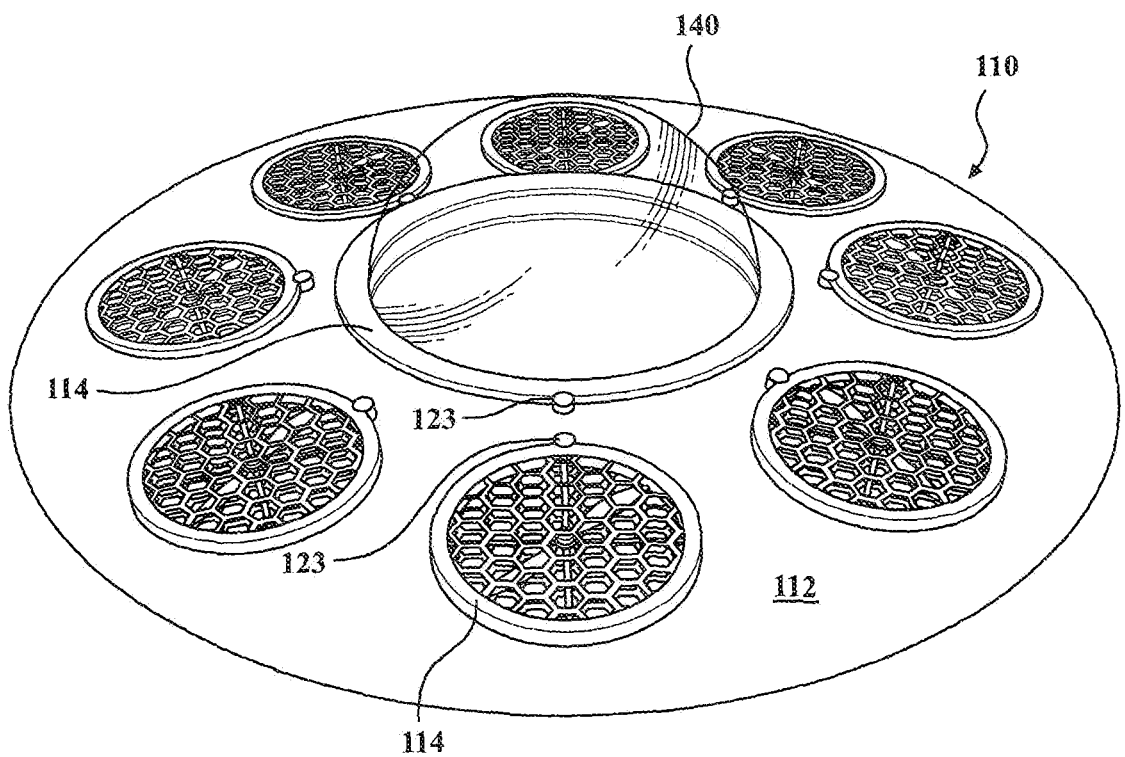
FIG. 5 is top perspective view of an exemplary drone with multiple propulsion systems.

Referring to FIG. 5, a top perspective view is shown of drone 110, which is configured to resemble a spaceship or a UFO. As illustrated, drone 110 has a cabin portion 140. It is contemplated that the cabin portion 140 could be sized and shaped any number of ways. In some examples, cabin portion 140 could be a passenger cabin or a cargo cabin. Cabin portion 140 is drawn in the middle region of the drone 110, but it need not be. Cabin 140 can be placed in any position of housing 112, including along its periphery. Cabin portion 140 is drawn as substantially spherical, but other configurations are contemplated, including but not limited disc shapes. Cabin portion 140 may be comprised of any number of materials including metal, carbon fiber, and plastic and combinations thereof. Cabin portion 140 may have doors, internal seating, windows comprising glass and or plastic, and any number of adornments.

Figure 6:
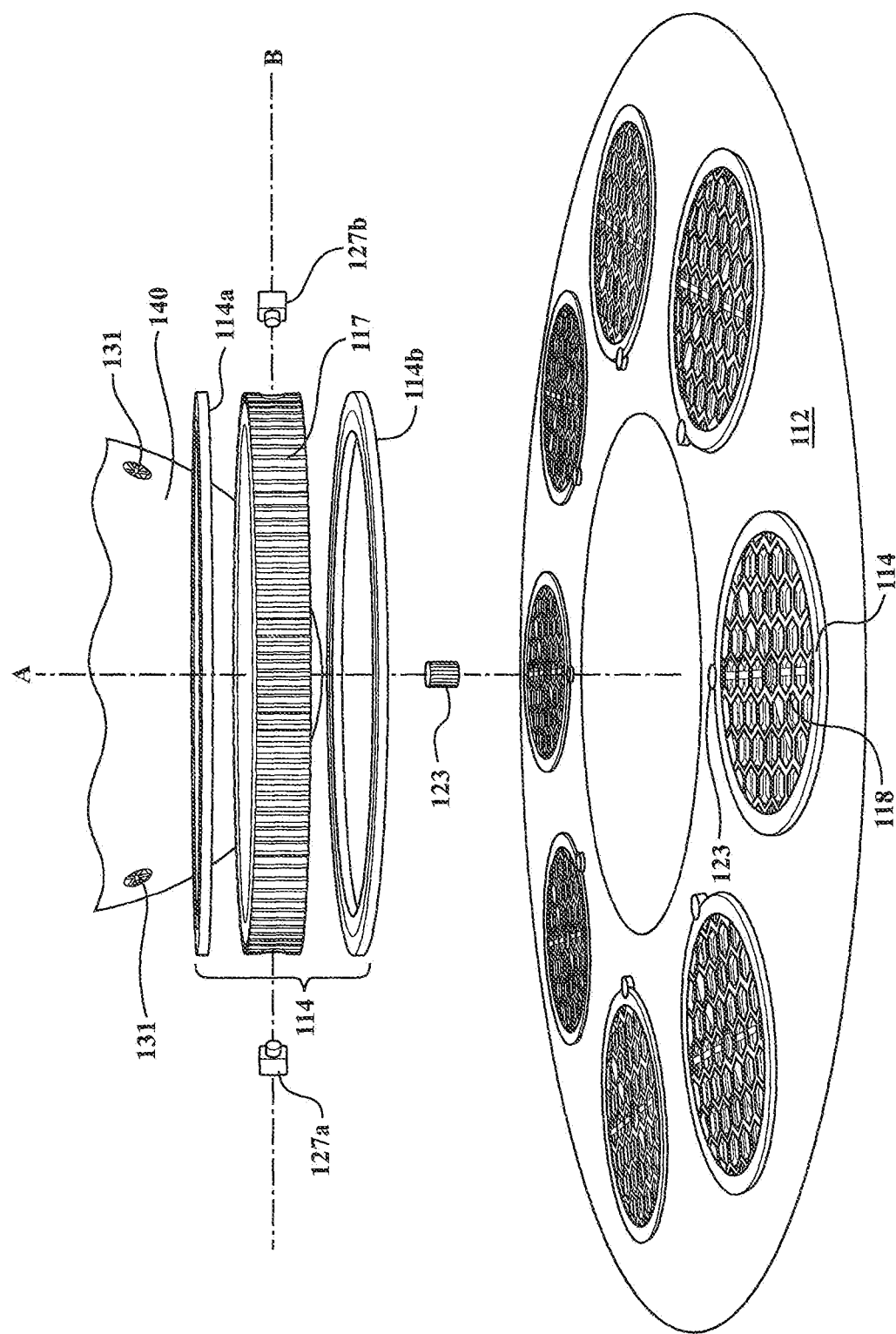
FIG. 6 is a simplified exploded view of the exemplary drone of FIG. 5.

Referring to FIGS. 5 and 6, drone 110 has housing 112 about a periphery of cabin portion 140, although housing 112 is not in direct contact with cabin portion 140. Rather, ring assembly 114 is attached to housing 112 through the immovable portions of bearing 114a and 114b. Ring assembly 114 has a configuration that is akin to that of ring assembly 14 of FIGS. 1-3. The movable portion of bearings 114a and 114b are attached with wall 117, and they move as a unit. External rotator 123 drives circumferential motion of that unit about axis A in response to instructions received at a controller in electrical communication with the external rotator. Internal rotators 127a and 127b are attached to wall 117 at openings (not visible) and are attached at receiving structure on cabin portion 140. The openings are positioned opposite each other in the wall. The receiving structure can take on any of a number of configurations, including configurations that are akin to receiving structure 31 in FIG. 4. At least one of internal rotators 127a and 127b actively drives rotation about an axis B that is perpendicular to axis A in response to instructions received at a controller in electrical communication with the internal rotators.

The housing 112 about the periphery of cabin portion 140 supports, indirectly, a plurality of propulsion systems. Though not required in practice, for exemplary purposes, each of the illustrated propulsion systems has a configuration that is akin to those described in FIG. 3 in protective cage 18. For example, protective cage 118 is akin to protective cage 18 in FIG. 3, and ring assembly 114 (and its components) and external rotator 123 are akin to ring assembly 14 and external rotator 23 in FIG. 3. Multiple propulsion systems permits an increase in thrust relative to a single propulsion system. It is contemplated that the individual propulsion systems may operate independently of one another such that failure of one system does not cause failure of all systems. It is also contemplated that the individual propulsion systems may operate together to execute particular instructions received, whether those individual propulsion systems would tilt or otherwise adjust in the same way or a different way as other individual propulsion systems to execute the instructions meant to drive the drone 110 as a whole.

Referring to FIGS. 5 and 6, there are versions of the embodiment of FIG. 5 where it may be desirable for cabin portion 140 to be kept level to the ground regardless of orientation of housing 112. For example, an instruction may be sent to cause where housing 112 is to reorient. To keep the cabin portion 140 level, the data sensed from one or more sensors is provided to the controller. The controller processes the data (orientation, acceleration, speed, etc.) and sends instructions to the internal rotators (127a, 127b) to rotate the cabin portion 140 to counteract the angle being implemented by the housing 112. For example, if the housing 112 is instructed to tilt forty-five degrees, then the controller will cause the internal rotators (127a, 127b) to rotate cabin portion 140 negative forty-five degrees.

As illustrated, internal rotators (127a, 127b) are connected to the cabin portion 140 using receiving structure 131 for rotation about axis B. It is contemplated the connection could be made using any of a number of mechanical or electro-mechanical connections, including but not limited to the type illustrated in FIG. 4. The cabin portion 140 is also able to rotate about a axis A, driven by its external rotator 123. This configuration permits the cabin portion 140 to maintain a level position, independent of the orientation of the drone 110 and its housing 112.

Figure 7:
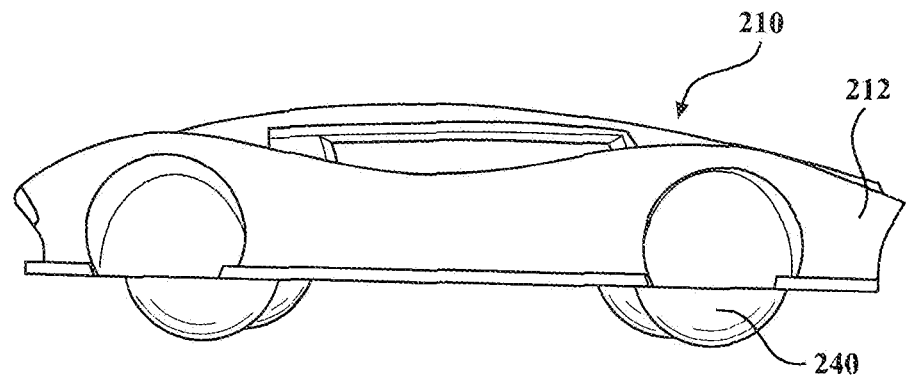
FIG. 7 is a side view of an exemplary unmanned land vehicle.

Referring to FIG. 7, an unmanned land vehicle 210 is illustrated. Vehicle 210 has wheel assemblies 240 installed within vehicle body 212 using a similar ring assembly/external rotator/internal rotators configuration as disclosed in FIG. 3 to provide full spherical rotation of the wheel assemblies 240 in any direction. As illustrated, wheel assembly 240 is a spherical structure. The spherical structure could be solid, hollow, or partially filled with reinforcing structures. The spherical structure could comprise any number of materials, including metal, carbon fiber, rubber, plastic, or other materials or combinations of materials. The wheel assembly 240 could also be more like a traditional tire-and-wheel-on-an-axle type of assembly, where internal rotators attached to receiving structure at axle ends.

Figure 8:
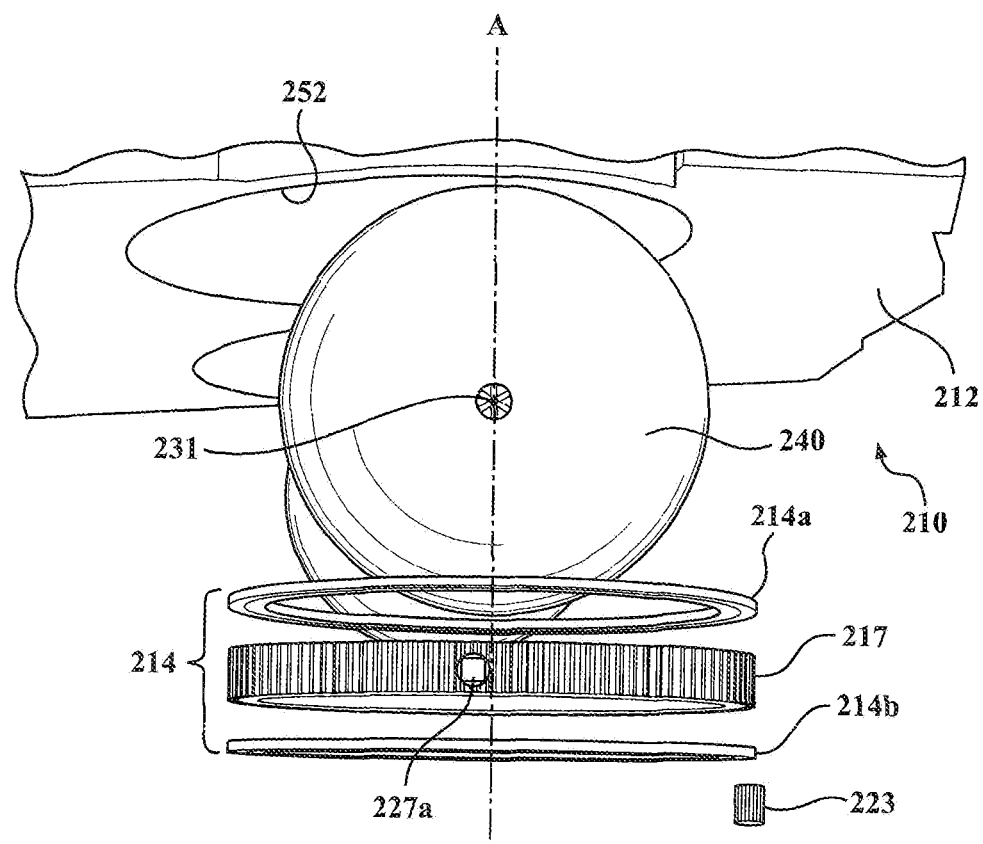
FIG. 8 is a simplified exploded view of the unmanned land vehicle of FIG. 7.

Referring to FIGS. 7 and 8, ring assembly 214 is attached to body 212 in receptacle 252. The immovable portions of bearings 214a and 214b may be fixed to the body, while the movable portions of bearings 214a and 214b are fixed to wall 217 that is driven circumferentially about axis A by external rotator 223 in response to instructions received at a controller in electrical communication with the external rotator. Internal rotator 227a has multiple sides and is fixed on one of its sides to wall 217 at an opening in wall 217 (not visible) and is attached on another of its sides to receiving structure 231 on wheel assembly 240. A second internal rotator (not visible) opposite internal rotator 227a has multiple sides and is fixed on one side to wall 217 at an opening in wall 217 (not visible) and is attached on another side to receiving structure 231 on wheel assembly 240. At least one of internal rotators 227a and 227b actively drives rotation about an axis that is perpendicular to axis A and extends through 227a and 227b (into the plane of the drawing and therefore not shown) in response to instructions received at a controller in electrical communication with the internal rotators.

Figure 9:
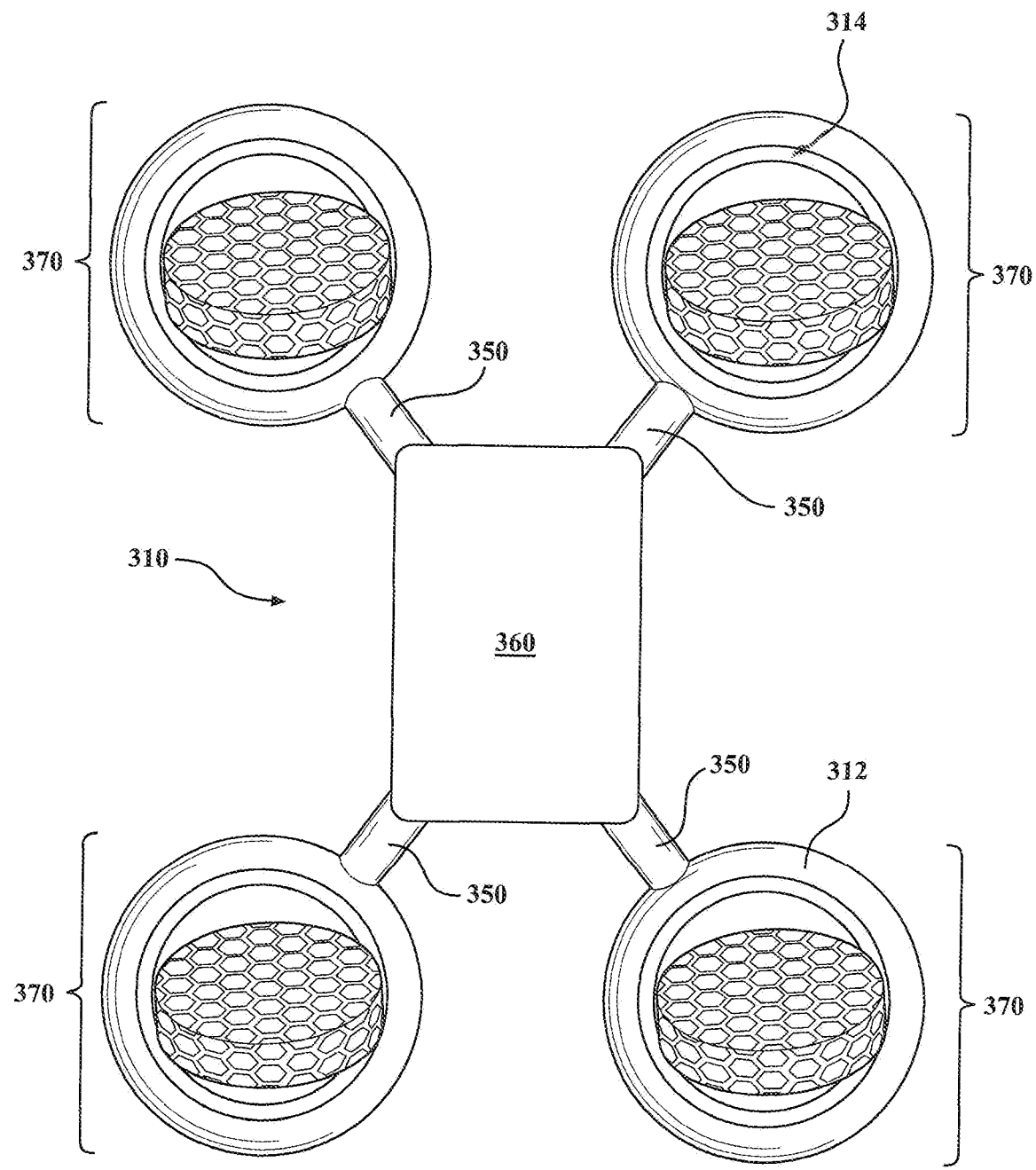
FIG. 9 is a top view of an exemplary drone.
Figure 10:
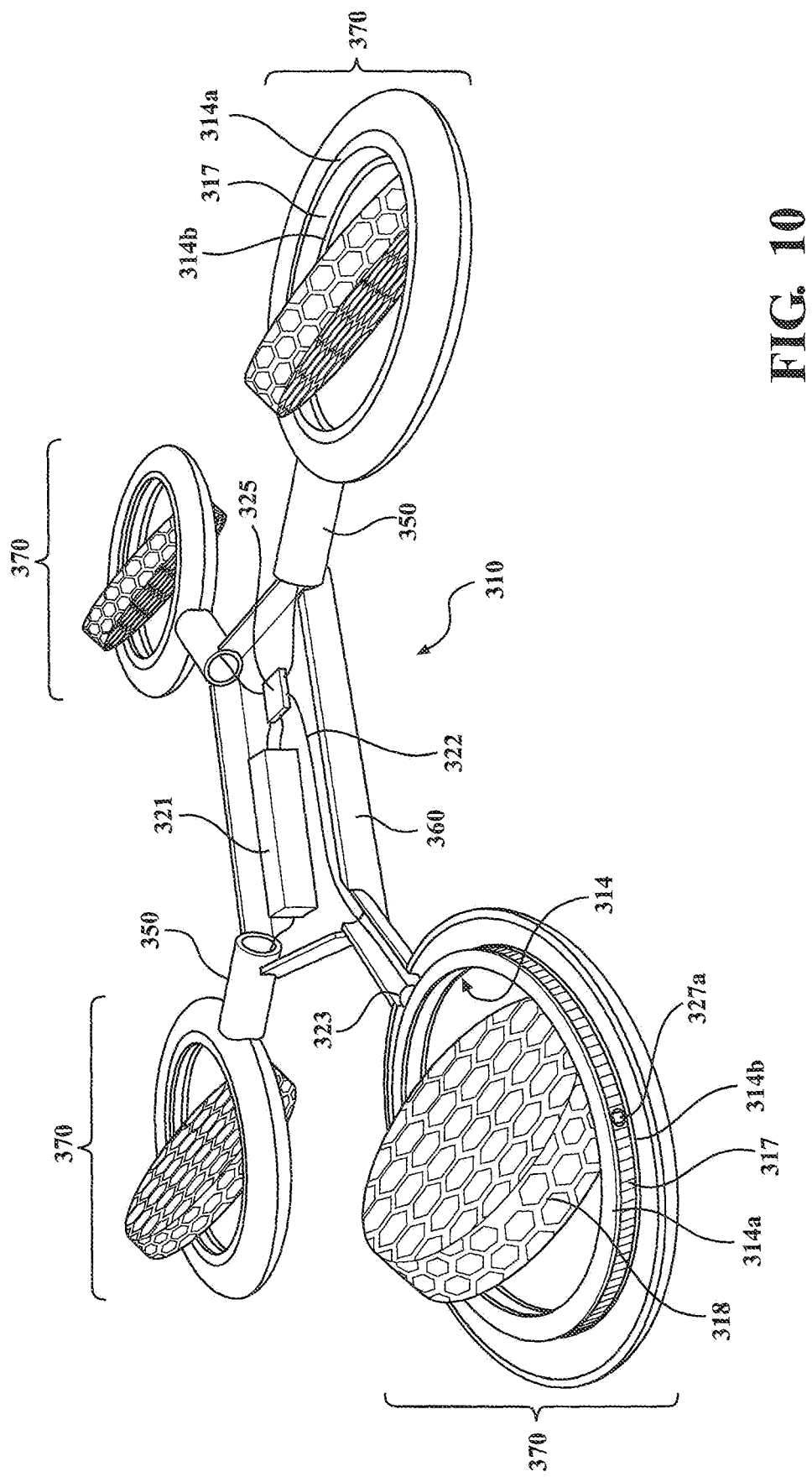
FIG. 10 is partially cutaway view of the drone of FIG. 9.

Referring to FIGS. 9-10, an exemplary modular drone 310 is described. Drone 310 has a core 360 and arms 350 that extend from the core 360. The arms 350 each have end regions 370 in which a propulsion system is supported by ring assembly 314. In this embodiment, arms 350 may be removably attached from core 360 for a modular, easy-to-assemble configuration. In one embodiment, arms 350 are friction fit into receiving structure core 360. Any number of removable attachment mechanisms may be used in connection with arms 350, including but not limited to annular snap locks, torsional snap locks, cantilever snap locks, and others. Arms 350 may also be removably attached from housing 312 of end regions 370 for increased modularity. In some embodiments arms 350 can be or comprise a plug that includes conduits for electrical connections while having connectors such as male/female mechanical joints. In some embodiments, arms 350 include one or more sensors or speed controllers in electrical communication with controller 325.

Modularity may permit easy assembly and disassembly for upgrading or exchanging components. The modularity may also allow for easy replacement of broken parts. A modular configuration of drone 310 may also offer increased durability if, for example, one or more arms 350 become separated from the core 360 during operation. The remaining arms 350 would stay in place, and the drone 310 would continue to operate. The software would make calculations based at least in in part upon the sensed loss of magnitude of thrust and initial change of orientation resulting from the missing arms 350, and cause power to be redistributed to minimize disruption to the operation of drone 310. It would do so by causing additional current to be sent to certain propulsions systems and components and by causing reduced current to be sent to other propulsion systems and components as needed to accommodate for the missing arms 350 and corresponding reduced thrust magnitude and reduced weight.

Each arm 350 has an end region 370, and there is a propulsion system in each end region 370. In the illustrated embodiment, end region 370 has a ring assembly 314 attached. In the illustrated embodiment, the propulsion system is similar to the one in FIGS. 2 and 3, where propeller 16 and motor 20 are illustrated.

Referring to FIG. 10, a partial cutaway view of drone 310 is illustrated. A cover is removed from core 360 to show a power source (illustrated as battery 321) in electrical communication with the controller 25 and with any sensors or motors in each end region 370 through wiring 322 that extends through arms 350. A cover is removed from one of the end regions 370 to show ring assembly 314 and its components bearing 314a, bearing 314b, and wall 317 extending therebetween. Also shown is external rotator 323 and one of the internal rotators 327a in wall 317. External rotator 323 may be an assembly comprising a motor such as a servo. External rotator 323 is illustrated to have a mechanical engagement such as a toothed gear assembly with the outer surface of wall 317. At least one of the internal rotators 327a and its opposing internal rotator (not visible in this view) may comprise a motor such as a servo.

The propulsion systems of drone 310 may be configured similarly to the propulsion systems of FIGS. 1-3, using a propeller and a motor. Other propulsion systems are contemplated, as mentioned above. Depending upon the nature of the propulsion system, a protective cage 318 may be included that may at least partially encase the propulsion system. The propulsions systems of drone 310 can assume substantially any position in a sphere within ring assembly 314.

Figure 11:
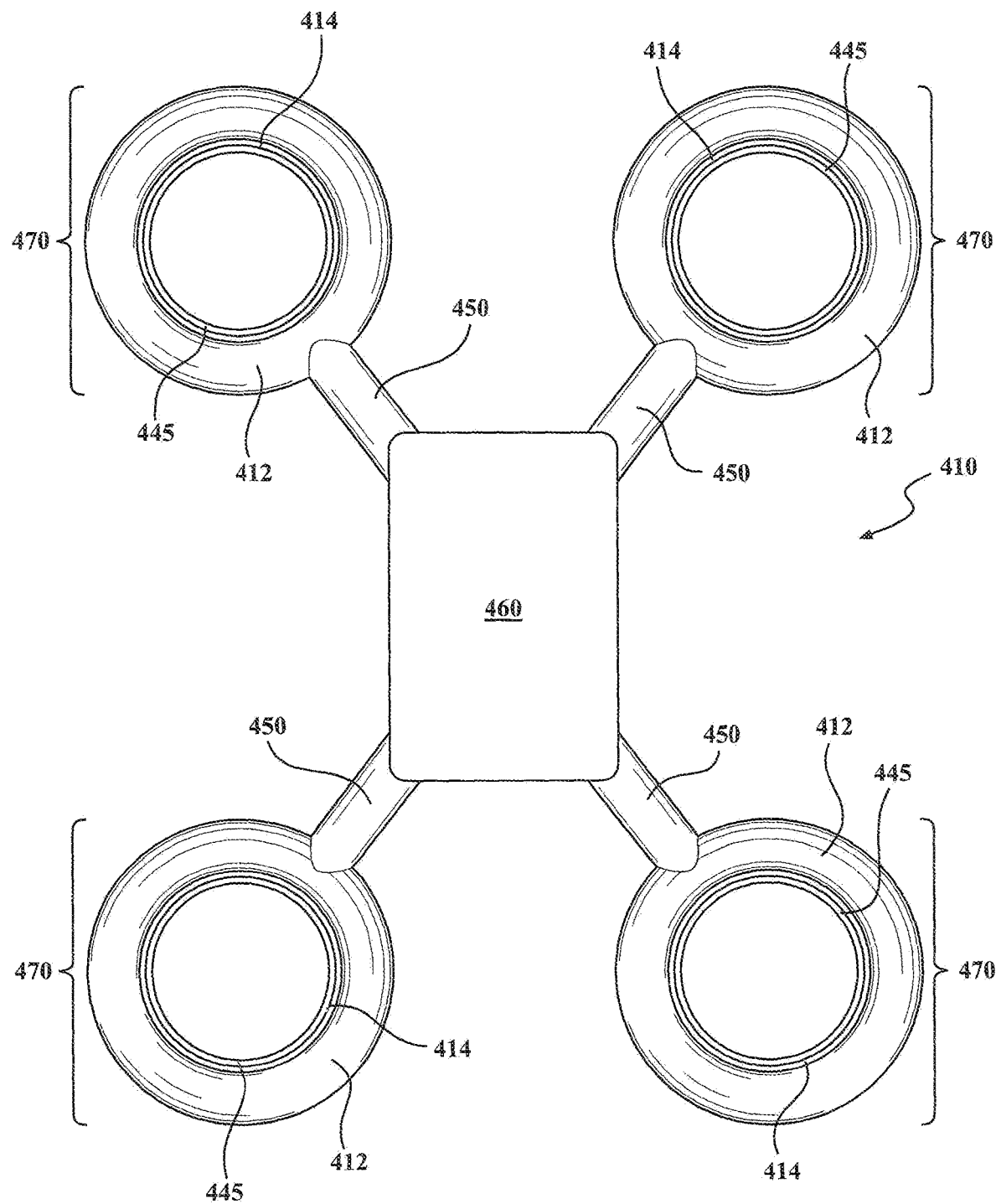
FIG. 11 is a top view of an exemplary drone.
Figure 12:
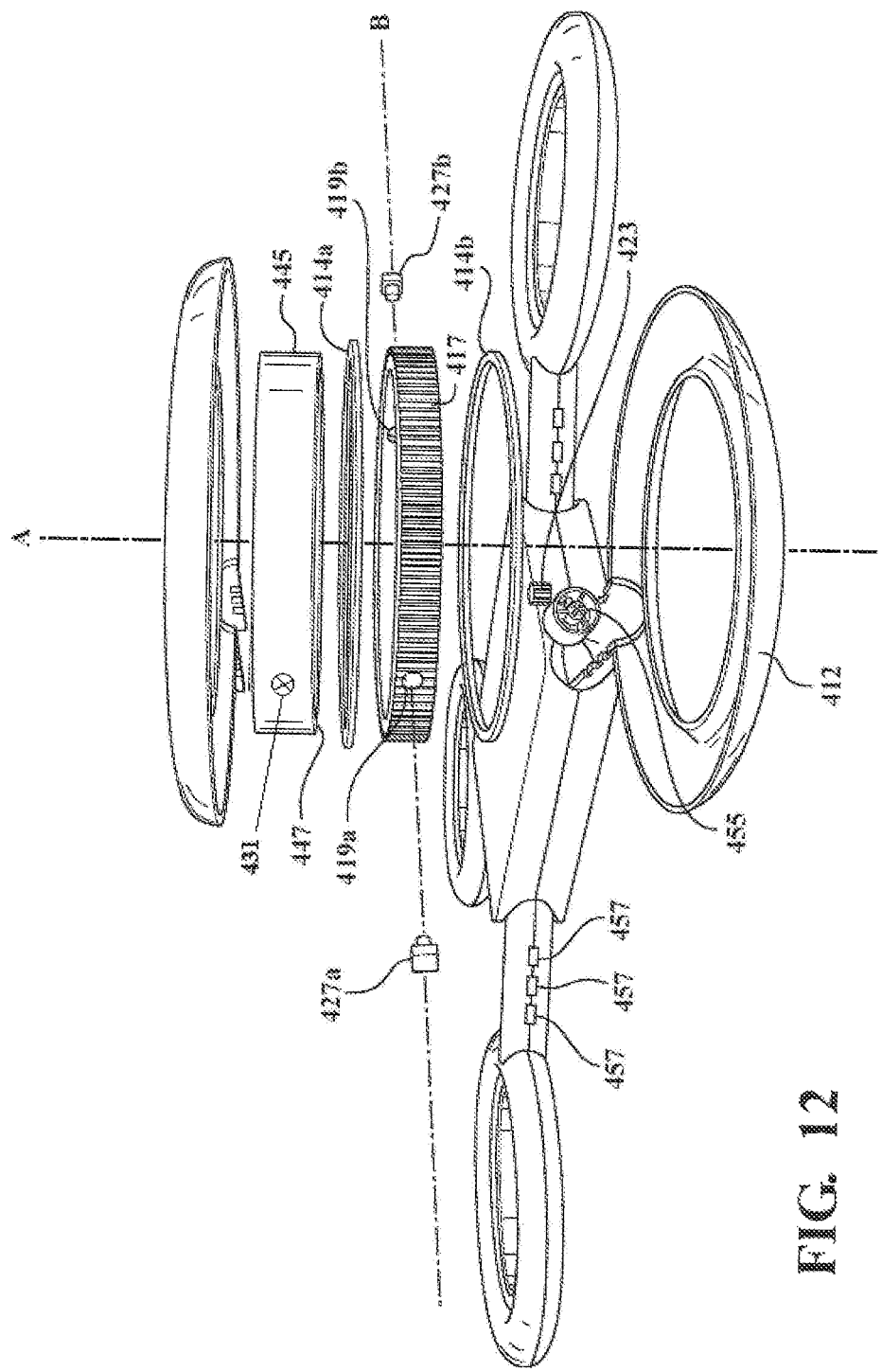
FIG. 12 is a simplified partially exploded view of the drone of claim 11.

Referring to FIGS. 11 and 12, an exemplary modular bladeless drone 410 is illustrated. Except for the bladeless propulsion system, the illustrated drone 410 is configured similarly to the drone 310 of FIGS. 9 and 10. Core 460 has arms 450 removably attached thereto. Arms 450 may be hollow, at least in part, and may have an end region 470. End region 470 includes an inner tube 445, which is supported by ring assembly 414 in housing 412 of end region 470.

In FIG. 12, a partially exploded view of exemplary drone 410 is drawn. In drone 410, the propulsion system is bladeless, and it includes elements outside of end region 470; namely, impeller 455. More specifically, drone 410 uses one or more vents 457 in arm 450, or one or more vents upstream (not shown), to make fluid available to impeller 455, which pulls fluid through the vents 457 and pushes fluid downstream around an interior of the end region 470 and through the opposed openings 419a and 419b to the inner tube 445, which has a channel 447. This illustrates one of the ways that hollow arms 450 may be in fluid communication with the inner tube 445. When fluid exits channel 447 in a first direction, it creates thrust in a second direction opposite the first direction. Although as illustrated, channel 447 is positioned along at least a portion of a bottom surface of inner tube 445, it is contemplated that that inner tube 445 may have a one or more openings through which fluid may flow in a direction opposite of the direction of thrust.

Inner tube 445 is supported in ring assembly 414, which comprises bearing 414a, bearing 414b, and wall 417 extending therebetween. External rotator 423 has an outer surface that mechanically engages with an outer surface of wall 417 to drive circumferential rotation about axis A. Internal rotators 427a and 427b are attached to wall 417 at openings 419a and 419b, and internal rotators 427a and 427b are also attached to receiving structure 431 on inner tube 445. Openings 419a and 419b are positioned opposite one another and each creates a passageway to permit fluid communication from hollow arms 450 to inner tube 445. Although internal rotators 427a and 427b reside in the passageways and may create some obstruction or turbulent fluid flow, it is contemplated that the openings 419a and 419b may be sized and shaped so that the internal rotators 427a and 427b do not substantially interfere with the thrust generation of the bladeless propulsion system.

At least one of internal rotators 427a and 427b are active and drive rotation of inner tube 445 about axis B, which is perpendicular to axis A. Rotation about axis A and rotation about axis B are independent of each other and can occur simultaneously, thereby permitting the inner tube 445 to assume substantially any position within a sphere inside the ring assembly 414.

Figure 13:
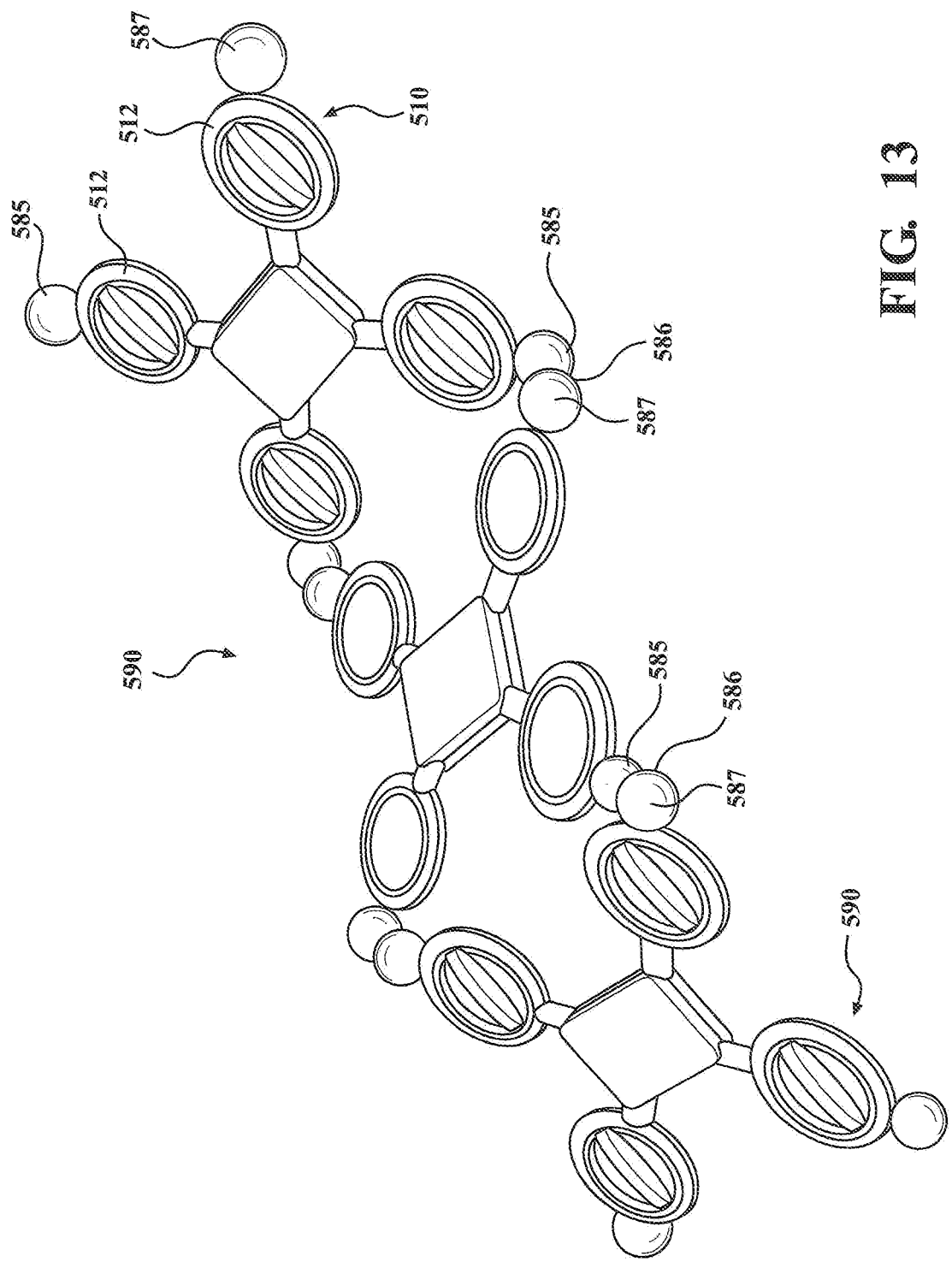
FIG. 13 is an exemplary drone system.

Referring to FIG. 13, an exemplary drone system 590 is illustrated. It comprises a plurality of unit drones 510. Unit drones 510 may be connected to one another, directly or indirectly. Connection may occur before or during operation. Connection, including magnetic connection between orb-shaped magnets 585 and orb-shaped electromagnets 587 may occur at any of a plurality of angles. When unit drones are connected, the plurality of unit drones 510 form a unitary body. Due to the nature of the connections, the unitary body may form flat and non-flap shapes, as illustrated. Additionally, the unitary body, or drone system 590, may be remotely controlled as though it were a single drone.

Unit drones 510 are illustrated as being the same as one another, but it is contemplated that one or more unit drones 510 may have a different configuration from other unit drones 510, including but not limited to different propulsion systems. In embodiments where unit drones 510 of drone system 590 are substantially similar, it is contemplated that drone system 590 may permit for increased or even constant operation. By way of example, if two unit drones 510 are connected together, one has a battery that is depleted, a third unit drone 510 meets the first two drones and connects to them. The unit drone 510 with the battery that is no longer functional drops out of the drone system 590. This process may continue each time a battery on a unit drone 510 fails. This may permit a plurality of unit drones 510 to connect together in an unlimited chain, allowing the combination of drones to function as long as backup unit drones 510 are available. Similarly, one of the connected unit drones 510 could charge while connected and act as a charge station for the other connected unit drones 510. These configurations may be advantageous where the drone system 590 is tasked to travel long distances or perform lengthy surveillance missions.

In drone system 590, the unit drones 510 include connection structure for connection to other drones or objects. Many connection structures are contemplated, including direct and indirect connection, reversible connections, mechanical engagement, magnetic attachment, and others known to those of skill in the art. As illustrated in the non-limiting example, certain unit drones 510 include electromagnets 587 attached to housing 512 and other unit drones 510 include magnets 585 attached to housing 512. Any number of electromagnets/magnets combinations may be suitable, including multiple magnets 510 per electromagnet 587. When in range of one another and powered, electromagnets 587 attract magnet 585 to create a reversible magnetic connection 586. It is contemplated that certain embodiments would include electromagnets that mimic permanent magnets where the components are attracted to one another until current is introduced to release a connection.

Attachments of connection structure such as electromagnets 587 and magnets 586 to unit drones 510 can be any of a number of suitable attachment mechanisms. For example, in some embodiments, attachments permitting electrical communication may be used. In some embodiments, mechanical clips, screws, nuts, pins and the like, and/or chemical adhesives may suffice.

Operationally, one step includes providing a plurality of unit drones, each having a controller in communication with sensors for sensing orientation, acceleration, speed, and other data about the unit drones. Another step includes providing a system controller that uses the sensed information from each and every of the unit drones to calculate orientation, acceleration, speed, about the drone system. The system controller is adapted to receive remote commands, for example from a user with a handheld remote control, computer, phone or electromyography glove, which are to be applied to the system. The remote commands may provide instructions to change direction, speed, or orientation of the drone system by adjusting roll, pitch and yaw, thrust, e.g., for the drone system. In another step, the system controller processes those system commands to determine the changes required to be made by each unit drone to achieve the desired effect on the drone system. In yet another step, the system controller sends signals to each of the unit drones and its associated individual processor. In another step, the individual processors send signals to their associated on-board components to execute the necessary unit drone roll, pitch and yaw, thrust, etc. to have the desired effect on the whole of the drone system. In some embodiments, the propeller motor, internal rotators, and the external rotator are the specific on-board components that execute the commands sent by the individual processor. These components make adjustments such as repositioning their respective propulsion systems (and by extension the related thrust vector) to the extent that the drone is equilibrated to or coming into equilibration with the intended plane orientation, speed, velocity, direction, and other parameters.

It is contemplated that any of a number of combinations of hardware and software known to those of skill in the art and commercially available may be suitable for use with this disclosure. One commercially available package that may be suitable is the ROPPOR swarm drone platform that integrates software, hardware, and a cloud system. The ROPPOR platform is available from ChemEssen Inc. in Seoul, South Korea.

Figure 14:
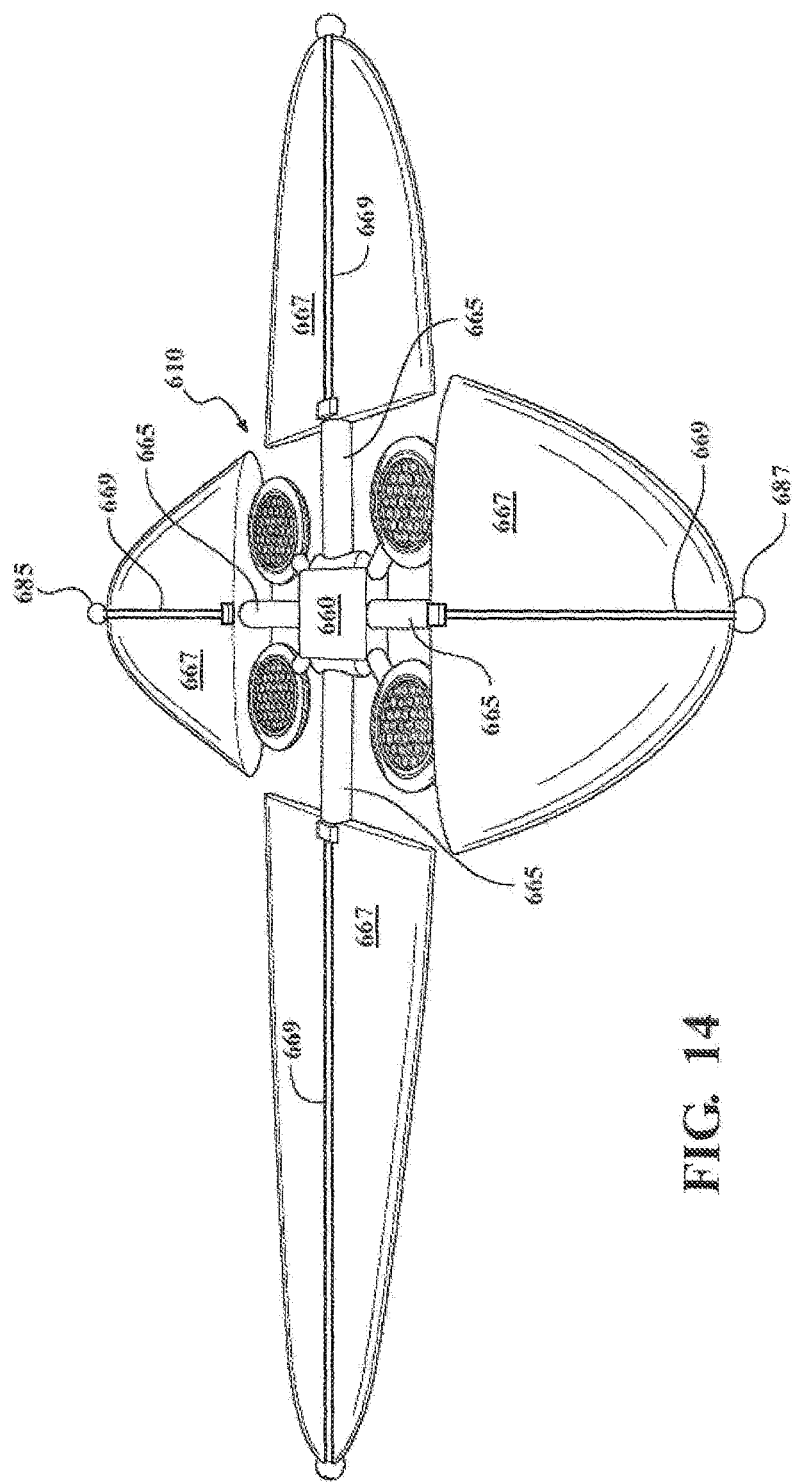
FIG. 14 is an exemplary unit drone in a drone system.

Referring to FIG. 14, a unit drone 610 is illustrated where a plurality of inflatable bladders 667 have been deployed and inflated by a deployment system. The inflatable bladder 667 may comprise any number of materials, including light weight and expandable materials such as a balloon skin. In some embodiments, the inflatable bladder 667 may comprise, in whole or in part, a solar skin. Where inflatable bladder 667 comprises a solar skin, said skin may be in electrical communication with a battery or recharging system or capacitor. In some embodiments, a controller can distribute energy collected from a solar skin on an as-needed basis to batteries in a system. The inflatable bladder 667 may be inflated with any of a number of light weight gases such that the volume of light weight gas is sufficient to overcome the weight of the components it carries. In other words, a drone system having at least one inflatable bladder 667 deployed and inflated requires less energy for operation than would be required in the absence of the deployed inflated bladder 667.

As illustrated, some of the plurality of inflated bladders 667 include electromagnets 687 at its end for connection to other unit drones 610 or other objects. Other of the plurality of inflated bladders 667 include magnet 685 at its end for connection to other unit drones 610 or other objects. Additionally, inflated bladders 667 may include one or more servo chains 669 comprising a servo and high strength string (which may carry an insulated conductor). In some embodiments, servo chains 669 may positioned along a periphery of inflatable bladder 667 and/or placed in other positions. Servo chains 669 may help the inflatable material to move, such as flapping like a bird after deployment. The servo chains 669 and/or inflatable bladder 667 may also provide physical support and electrical communication for the electromagnets 687 and magnets 685.

Figure 15:
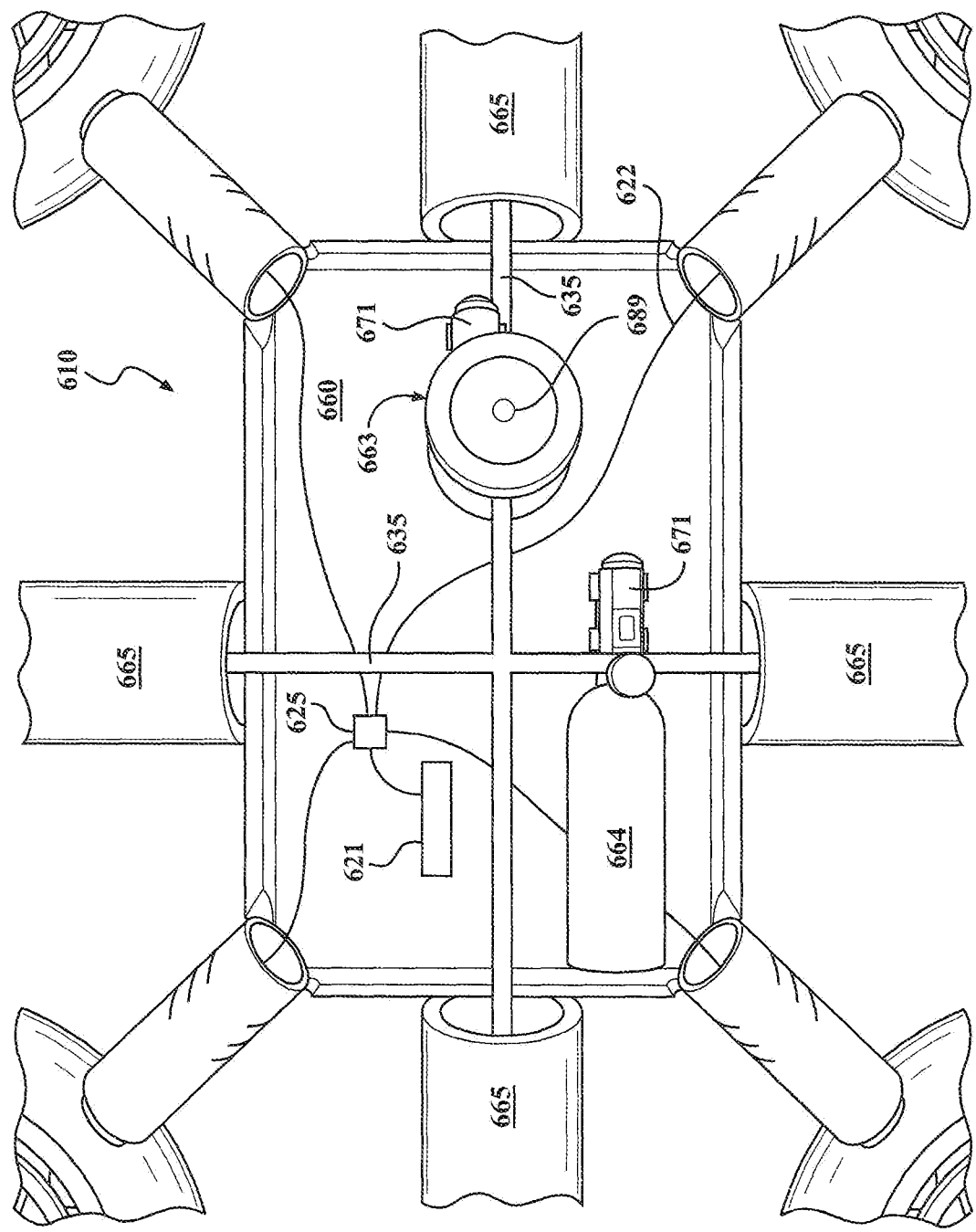
FIG. 15 is a simplified cutaway view of a unit drone in a drone system.

In unit drone 610, core 660 and a plurality of casings 665 support the deployment mechanism, an example of which is detailed in FIGS. 15 and 16. It is contemplated that casings 665 could fit within core 660 in some embodiments.

Referring to FIG. 15, a cutaway view of core 660 is shown. Controller 625 is in electrical communication with battery 621 via wiring 622 that extends into each of the propulsion systems. The battery 621 and controller 625 are illustrated as though they are positioned off center for ease of visibility, but battery 621 and controller 625 may be positioned more centrally in core 660. In the case of a drone system including a plurality of unit drones 610, the core 660 further includes a gas tank 664 in fluid communication with casings 665, inlet/outlet assembly 663 through tubing 635, as well as an inflation mechanism such as one or more air pumps 671. The inlet/outlet assembly 663 is drawn with outlet 689 being within a vertical tube that connects with tubing 635 and an inlet (obscured in this view) opposite outlet 689. A valve may be in the vertical tube to shut off the inlet when the outlet 689 is in use and vice versa. In some embodiments, the inlet/outlet assembly 663 may be a simple bore that acts both as inlet and outlet.

Referring to FIG. 16, a simplified exploded view of a casing 665 is illustrated. Casing 665 houses affiliated tubing 635, inner casings 672 which house inflatable bladders 667 and their affiliated connection structure. In the illustration the connection structure is magnet 685 for some bladders 667 and electromagnet 688 for other bladders 667. Inner casings 672 may also include electric valves 673 in electrical communication with one or more air pumps 671 which are in fluid communication with gas tank 664 to control fluid flow through deployment and retraction.

Referring to FIGS. 15 and 16, when controller 625 receives an instruction to deploy, it sends a signal to an at least one electric valve (not shown) in the inlet/outlet assembly 663. This signal causes the one or more of the electric valves to open, thereby opening the inlet (not shown, opposite the outlet 689) to allow pressurized fluid to enter the core 660 through tubing 635. The pressurized fluid then causes inflation of the inflatable bladder 667 and deployment of its connection structure and servo chain (not shown). The servo chain in turn controls the deployed shape of the inflatable bladder 667. In connection with deployment, the gas tank 664 can be used to store fluid for said deployment, using one or more air pumps 671 with which it is in fluid communication. The deployment system may additionally use pressure monitoring through sensors in electrical communication with controller 625 to provide inputs to control inflation. It is also contemplated that gas tank 664 may be omitted, and the deployment system use solely an external supply of pressurized fluid.

When the controller 625 receives an instruction to retract a deployed inflatable bladder (cause deflation), it sends a signal to one or more air pumps 671 to begin a vacuum action. This then causes the gas in the inflatable bladder 677 to expel at a rate controlled at least in part by its associated electric valve 673 and causes the inflatable bladder 677 to pull back into its inner casing 672 and expel gas through the outlet 689 of inlet/outlet assembly 663. Where there are more than one air pumps 671, in some embodiments, the air pump near the outlet 689 in assembly 663 may be selected for this action. In connection with retraction, the gas tank 664 can store and release gas since it is in fluid communication with air pump 671 and it is electrically controlled. The deployment system may use additionally use pressure monitoring through sensors in electrical communication with controller 625 to provide inputs to control deflation.

Referring to FIG. 17, an exemplary drone system 690 is illustrated. Drone system 690 includes a plurality of unit drones 610. The unit drones 610 are connected horizontally, in this example, by electromagnetic connections 686 that result when a electromagnet contacts a magnet. The unit drones 610 are connected vertically by a plurality of rods 696 that extend from one unit drone 610 to another unit drone 610. The rods 696 may be secured to or through or on unit drones 610 by any of a number of fastening means, including but not limited mechanical clips, screws, nuts, pins and the like, and/or chemical adhesives. In one embodiment, the plurality of unit drones 610 are connected before drone system 690 is remotely controlled.

Scalability

It is contemplated that the drones and drone systems described may include propulsion systems generating thrust for toy or hobby applications. It is also contemplated that larger-scale structures such as air and water vessels and land vehicles may include the claimed subject matter. In larger-scale applications of the claimed subject matter, it is contemplated that a greater number of propulsion systems could be used, more powerful propulsion systems could be used, stronger light-weight materials could be implemented in housings, and additional computing power and power sources may be included. Scaling up can also be achieved at least in part by using the drone systems disclosed herein, where unit drones are attached to create a drone system benefiting from the thrust of all unit drones in combination.

Remote Control

It is contemplated that the drones and drone systems described herein may be controlled remotely using any of a number of commercially available systems and standard communication protocols. The drones and drone system may be remotely controlled through any number of transmitters including but not limited to RC transmitters, GPS, Wi-Fi, Li-Fi, 3G, 4G, 5G, satellite, Bluetooth, sonar, mechanically driving, or wireless connection from computer or electromyography glove or other handheld device or wearable device. Such remote control sends signals to an onboard controller, which can also have input from sensors positioned in or on drones and drone systems. Using calculations with the input of desired direction and the sensed data, the controller causes the physical structure to react—adjusting orientation, roll, pitch, yaw, thrust, speed and any other reactions for execution.

Referring generally to the entirety of above description and material incorporated by reference, the text and drawings shall be interpreted as illustrative rather than limiting. Changes in detail or structure may be made without departing from the present disclosure. Various embodiments are described above to provide a general understanding of the overall structure and function of the drones and drone systems. Particular configurations, assemblies, or components and functions described with respect to one embodiment may be combined, in whole or in part, with those of other embodiments. Well-known operations, components, and elements such as simple attachment devices have not been described in detail so as not to obscure the embodiments described in the specification. While processes, systems, and methods may be described herein in connection with one or more steps in a particular sequence, such methods may be practiced with the steps in a different order, with certain steps performed simultaneously, with additional steps, and/or with certain described steps omitted.

All references to electronic controllers such as electronic controller 25 are to be broadly construed. An electronic controller may include a processor, including a programmable microprocessor and/or microcontroller. An electronic controller may include an application specific integrated circuit (ASIC). An electronic controller may include a central processing unit (CPU), a memory (e.g., a nontransitory computer-readable storage medium), and/or an input/output (I/O) interface. An electronic controller may be configured to perform functions with programming instructions embodied in software and/or hardware. An electronic controller may include a plurality of controllers. An electronic controller may include a conventional processing apparatus, which can execute preprogrammed instructions. To the extent that the described methods are embodied software, the software can be stored in memory and can perform such methods. An electronic controller may have ROM, RAM, and/or a combination of non-volatile and volatile memory so that any software may be stored while allowing storage and processing of dynamically produced data and signals.

All references to sensors are to be broadly construed. Generally sensors are capable of detecting, sensing and/or measuring data and communicating said data to a controller capable of receiving said data. Sensors may also have processing capability. Sensors may include one or more three-axis accelerometers to stabilize the drone. Such accelerometers may sense linear acceleration along three axes. Sensors may include one or more three-axis gyroscopes. Such gyroscopes sense angular acceleration along three axes. Sensors may include magnetometers. Magnetometers act as a magnetic compass which can measure magnetic field of the earth. This may be used to determine direction of a compass direction that is determined with respect to magnetic north. Sensors may include one or more barometers also referred to as pressure sensors. Sensors may include GPS sensors that use satellites launched around the Earth to determine specific geographic locations. GPS sensors may be used to determine a specific route or to provide data to assist a drone in returning back to its original position. Sensors may include distance sensors. Distance sensors are used to sense obstacles. Exemplary distance sensors may be ultrasonic, laser based or LIDAR based. Combinations of sensors are also included in the term sensors, such as inertial measurement unit (IMU) sensors that senses and reports a body's specific force, angular rate, and/or its magnetic field, using a combination of accelerometers, gyroscopes, and magnetometers.

Words referring to relative position (upper, lower, upward, downward, top, bottom, above, below, vertical, horizontal, etc.) are only used to aid understanding of the disclosure, and do not create limitations, particularly as to the position, orientation, or use of embodiments. Similarly, words describing connections (attached, connected supported, fitted, etc.) are to be construed broadly and may include intermediate members between a connection of elements and relative movement between elements. As such, these references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive.

The invention claimed is:

1. A drone, comprising:
   a housing;
   a ring assembly supported by the housing, the ring assembly comprising a top bearing with a top movable inner portion and a bottom bearing with a bottom movable inner portion and a wall connected with and extending between the top movable inner portion and the bottom movable inner portion;
   an external rotator supported by the housing, the external rotator being outside of the ring assembly and having an outer surface mechanically engaged with an outer surface of the wall in the ring assembly, the external rotator configured to drive circumferential rotation of the movable portions of the ring assembly about a first axis; and
   the wall of the ring assembly having a pair of openings opposite one another, each opening having an internal rotator therein, the pair of internal rotators directly or indirectly supporting a propulsion system inside the ring assembly, where at least one of the internal rotators is configured to drive rotation of the propulsion system about a second axis perpendicular to the first axis;
   wherein, in operation, the housing has an orientation that is independent of an orientation of the propulsion system, and rotation of the ring assembly about the first axis is independent of rotation of the propulsion system about the second axis, permitting the propulsion system to assume substantially any position within a sphere inside the ring assembly.

2. The drone of claim 1, wherein at least one of the internal rotators is active.

3. The drone of claim 1, wherein the drone further comprises a power source and controller adapted to receive and execute instructions, wherein the power source and controller are in electrical communication with each propulsion system.

4. A drone, comprising:
   a cabin portion;
   a housing about the periphery of the cabin portion indirectly supporting the cabin portion;
   a ring assembly supported by the housing, the ring assembly comprising a top bearing with a top movable inner portion and a bottom bearing with a bottom movable inner portion and a wall connected with and extending between the top movable inner portion and the bottom movable inner portion;
   an external rotator supported by the housing, the external rotator being outside of the ring assembly and having an outer surface mechanically engaged with an outer surface of the wall in the ring assembly, the external rotator configured to drive circumferential rotation of the movable portions of the ring assembly about a first axis;
   the wall of the ring assembly having a pair of openings opposite one another, each opening having an internal rotator therein, the pair of internal rotators directly or indirectly supporting the cabin portion inside the ring assembly, where at least one of the internal rotators is configured to drive rotation of the central portion about a second axis perpendicular to the first axis; wherein, in operation, the housing has an orientation that is independent of an orientation of the cabin portion; and
   the housing supports at least one propulsion system.

5. An unmanned land vehicle, comprising:
   a vehicle body;
   a ring assembly supported by the vehicle body, the ring assembly comprising a top bearing with a top movable inner portion and a bottom bearing with a bottom movable inner portion and a wall connected with and extending between the top movable inner portion and the bottom movable inner portion;

an external rotator supported by the vehicle body, the external rotator being outside of the ring assembly and having an outer surface mechanically engaged with an outer surface of the wall in the ring assembly, the external rotator configured to drive circumferential rotation of the movable portions of the ring assembly about a first axis; and the wall of the ring assembly having a pair of openings opposite one another, each opening having an internal rotator therein, the pair of internal rotators directly or indirectly supporting a wheel assembly inside the ring assembly, where at least one of the internal rotators is configured to drive rotation of the wheel assembly about a second axis perpendicular to the first axis.

6. A drone, comprising:

a core including a power source and a controller, the power source being in electrical communication with the controller; and a plurality of arms extending from the core, each arm having an end region distal from the core, each end region including a propulsion system in electrical communication with the controller, the propulsion system comprising a propeller and a motor;

a ring assembly supported by a housing of the end region, the ring assembly comprising a top bearing with a top movable inner portion and a bottom bearing with a bottom movable inner portion and a wall connected with and extending between the top movable inner portion and the bottom movable inner portion;

an external rotator supported by the housing of the end region, the external rotator being outside of the ring assembly and having an outer surface mechanically engaged with an outer surface of the wall in the ring assembly, the external rotator configured to drive circumferential rotation of the movable portions of the ring assembly about a first axis; and the wall of the ring assembly having a pair of openings opposite one another, each opening having an internal rotator therein, the pair of internal rotators directly or indirectly supporting the propulsion system inside the ring assembly, where at least one of the internal rotators is configured to drive rotation of the propulsion system about a second axis perpendicular to the first axis;

wherein, in operation, the housing of the end region has an orientation that is independent of an orientation of the propulsion system, and rotation of the ring assembly about the first axis is independent of rotation of the propulsion system about the second axis, permitting the propulsion system to assume substantially any position within a sphere inside the ring assembly.

7. The drone of claim 6, wherein at least one arm is removably attached to the core.

8. The drone of claim 6, wherein each propulsion system is at least partially encased in a protective cage.

9. The drone of claim 6, wherein at least one of the internal rotators comprises a motor.

10. The drone of claim 6, wherein the external rotator is an assembly comprising a motor.

11. The drone of claim 6, wherein the mechanical engagement of the external rotator and the outer surface of the wall comprises a toothed gear assembly.

12. A drone, comprising:

a core including a power source and a controller, the power source being in electrical communication with the controller; and a plurality of hollow arms extending from the core, the core or at least one arm having at least one vent permitting fluid flow, the vent being positioned upstream of an impeller supported, directly or indirectly, by the arm, the impeller being powered by a motor in electrical communication with the controller and power source, the impeller configured to increase the fluid flow and direct the fluid flow in a direction away from the core;

a ring assembly supported by a housing of an end region of the at least one arm, the ring assembly comprising a top bearing with a top movable inner portion and a bottom bearing with a bottom movable inner portion and a wall connected with and extending between the top movable inner portion and the bottom movable inner portion;

an external rotator supported by the housing of the end region of the at least one arm, the external rotator being outside of the ring assembly and having an outer surface mechanically engaged with an outer surface of the wall in the ring assembly, the external rotator configured to drive circumferential rotation of the movable portions of the ring assembly about a first axis;

the wall of the ring assembly having a pair of openings opposite one another, each opening having an internal rotator therein, the pair of internal rotators directly or indirectly supporting an inner tube inside the ring assembly, where at least one of the internal rotators is configured to drive rotation of the inner tube about a second axis perpendicular to the first axis;

wherein the inner tube is in fluid communication with the hollow arm, and the inner tube has at least one opening through which the fluid exits the drone in a direction opposite a direction of thrust; and wherein rotation about the first axis and second axis are independent of each other and can occur simultaneously, thereby permitting the inner tube to assume substantially any position within a sphere inside the ring assembly.

13. The drone of claim 12, wherein the at least one opening in the inner tube is a channel along at least a portion of a bottom surface of the inner tube.

14. The drone of claim 13, wherein the fluid communication between the at least one hollow arm and the inner tube comprises a pair of passageways positioned opposite one another downstream of the impeller.

* * * * *